US010922736B2

(12) United States Patent
Williams et al.

(10) Patent No.: US 10,922,736 B2
(45) Date of Patent: Feb. 16, 2021

(54) SMART ELECTRONIC DISPLAY FOR RESTAURANTS

(71) Applicant: Manufacturing Resources International, Inc., Alpharetta, GA (US)

(72) Inventors: David Williams, Canton, GA (US); Doug Bennett, Alpharetta, GA (US); William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 527 days.

(21) Appl. No.: 15/145,526

(22) Filed: May 3, 2016

(65) Prior Publication Data

US 2016/0335705 A1 Nov. 17, 2016

Related U.S. Application Data

(60) Provisional application No. 62/162,420, filed on May 15, 2015.

(51) Int. Cl.
*G06Q 30/06* (2012.01)
*G06Q 50/12* (2012.01)
*H04W 4/80* (2018.01)

(52) U.S. Cl.
CPC ..... *G06Q 30/0631* (2013.01); *G06Q 30/0635* (2013.01); *G06Q 30/0643* (2013.01); *G06Q 50/12* (2013.01); *H04W 4/80* (2018.02)

(58) Field of Classification Search
CPC .......... G06Q 30/0631; G06Q 63/0635; G06Q 30/0643; G06Q 50/12; H04W 4/80
See application file for complete search history.

(56) References Cited

U.S. PATENT DOCUMENTS

| 4,271,410 A | 6/1981 | Crawford |
| 4,399,456 A | 8/1983 | Zalm |
| 4,456,910 A | 6/1984 | DiMassimo et al. |

(Continued)

FOREIGN PATENT DOCUMENTS

| CN | 1613264 A | 5/2005 |
| CN | 101777315 A | 7/2010 |

(Continued)

OTHER PUBLICATIONS

Rouaissia, Chaouki. "P-132: Adding Proximity Detection to a Standard Analog-Resistive Touchscreen." SID Symposium Digest of Technical Papers. vol. 43. No. 1. Oxford, UK: Blackwell Publishing Ltd, 2012.*
AMS AG, TCS3404, TCS3414, Digital Color Sensors, Apr. 2011, 41 pages, Texas Advanced Optoelectronic Solutions Inc. is now ams AG.
Analog Devices, ADV212: JPEG 2000 Video Codec, http://www.analog.com/en/audiovideo-products/video-compression/ADV212/products/pr . . . , accessed Oct. 15, 2008, 2 pages.

(Continued)

*Primary Examiner* — Asfand M Sheikh
(74) *Attorney, Agent, or Firm* — Standley Law Group LLP; Jeffrey S. Standley; Adam J. Smith

(57) ABSTRACT

Exemplary embodiments herein provide a wireless transmitter/receiver which receives a unique identifier from a smart device and finds associated order history stored on an electronic storage device. A display controlling assembly may generate individualized image data based on the associated order history and transmits the individualized image data to the electronic menu board for display. In some embodiments, menu information is sent directly to the smart device.

12 Claims, 7 Drawing Sheets

(56) References Cited

U.S. PATENT DOCUMENTS

| | | |
|---|---|---|
| 4,571,616 A | 2/1986 | Haisma et al. |
| 4,593,978 A | 6/1986 | Mourey et al. |
| 4,753,519 A | 6/1988 | Miyatake |
| 5,029,982 A | 7/1991 | Nash |
| 5,049,987 A | 9/1991 | Hoppenstein |
| 5,081,523 A | 1/1992 | Frazier |
| 5,088,806 A | 2/1992 | McCartney et al. |
| 5,115,229 A | 5/1992 | Shalit |
| 5,162,645 A | 11/1992 | Wagensonner et al. |
| 5,162,785 A | 11/1992 | Fagard |
| 5,351,201 A | 9/1994 | Harshbarger, Jr. et al. |
| 5,402,141 A | 3/1995 | Haim et al. |
| 5,565,894 A | 10/1996 | Bates et al. |
| 5,656,824 A | 8/1997 | den Boer et al. |
| 5,663,952 A | 9/1997 | Gentry, Jr. |
| 5,694,141 A | 12/1997 | Chee |
| 5,751,346 A | 5/1998 | Dozier et al. |
| 5,835,074 A | 11/1998 | Didier et al. |
| 5,886,731 A | 3/1999 | Ebisawa |
| 5,912,743 A | 6/1999 | Kinebuchi et al. |
| 6,027,222 A | 2/2000 | Oki et al. |
| 6,032,126 A | 2/2000 | Kaehler |
| 6,055,012 A | 4/2000 | Haskell et al. |
| 6,075,556 A | 6/2000 | Urano et al. |
| 6,091,777 A | 7/2000 | Guetz et al. |
| 6,094,457 A | 7/2000 | Linzer et al. |
| 6,100,906 A | 8/2000 | Asaro et al. |
| 6,153,985 A | 11/2000 | Grossman |
| 6,192,083 B1 | 2/2001 | Linzer et al. |
| 6,259,492 B1 | 7/2001 | Imoto et al. |
| 6,292,157 B1 | 9/2001 | Greene et al. |
| 6,292,228 B1 | 9/2001 | Cho |
| 6,297,859 B1 | 10/2001 | George |
| 6,326,934 B1 | 12/2001 | Kinzie |
| 6,359,390 B1 | 3/2002 | Nagai |
| 6,392,727 B1 | 5/2002 | Larson et al. |
| 6,417,900 B1 | 7/2002 | Shin et al. |
| 6,421,103 B2 | 7/2002 | Yamaguchi |
| 6,421,694 B1 | 7/2002 | Nawaz et al. |
| 6,428,198 B1 | 8/2002 | Saccomanno et al. |
| 6,536,041 B1 | 3/2003 | Knudson et al. |
| 6,546,294 B1 | 4/2003 | Kelsey et al. |
| 6,553,336 B1 | 4/2003 | Johnson et al. |
| 6,587,525 B2 | 7/2003 | Jeong et al. |
| 6,642,666 B1 | 11/2003 | St-Germain |
| 6,674,463 B1 | 1/2004 | Just et al. |
| 6,690,726 B1 | 2/2004 | Yavits et al. |
| 6,697,100 B2 | 2/2004 | Tatsuzawa |
| 6,698,020 B1 | 2/2004 | Zigmond et al. |
| 6,712,046 B2 | 3/2004 | Nakamichi |
| 6,812,851 B1 | 11/2004 | Dukach et al. |
| 6,820,050 B2 | 11/2004 | Simmon et al. |
| 6,825,899 B2 | 11/2004 | Kobayashi |
| 6,850,209 B2 | 2/2005 | Mankins et al. |
| 6,859,215 B1 * | 2/2005 | Brown ................ G06F 19/3475 |
| | | 715/811 |
| 6,996,460 B1 | 2/2006 | Krahnstoever et al. |
| 7,038,186 B2 | 5/2006 | De Brabander et al. |
| 7,057,590 B2 | 6/2006 | Lim et al. |
| 7,103,852 B2 | 9/2006 | Kairis, Jr. |
| 7,136,415 B2 | 11/2006 | Yun et al. |
| 7,174,029 B2 | 2/2007 | Agostinelli et al. |
| 7,304,638 B2 | 12/2007 | Murphy |
| 7,307,614 B2 | 12/2007 | Vinn |
| 7,319,862 B1 | 1/2008 | Lincoln et al. |
| 7,358,851 B2 | 4/2008 | Patenaude et al. |
| 7,385,593 B2 | 6/2008 | Krajewski et al. |
| 7,391,811 B2 | 6/2008 | Itoi et al. |
| 7,480,042 B1 | 1/2009 | Phillips et al. |
| 7,518,600 B2 | 4/2009 | Lee |
| 7,519,703 B1 * | 4/2009 | Stuart ................ G06F 21/554 |
| | | 709/217 |
| 7,573,458 B2 | 8/2009 | Dunn |
| 7,581,094 B1 | 8/2009 | Apostolopoulos et al. |
| 7,614,065 B2 | 11/2009 | Weissmueller et al. |
| 7,636,927 B2 | 12/2009 | Zigmond et al. |
| 7,669,757 B1 | 3/2010 | Crews et al. |
| 7,714,834 B2 | 5/2010 | Dunn |
| 7,764,280 B2 | 7/2010 | Shiina |
| 7,810,114 B2 | 7/2010 | Flickinger et al. |
| 7,813,694 B2 | 10/2010 | Fishman et al. |
| 7,825,991 B2 | 11/2010 | Enomoto |
| 7,924,263 B2 | 4/2011 | Dunn |
| 7,937,724 B2 | 5/2011 | Clark et al. |
| 7,988,849 B2 | 8/2011 | Biewer et al. |
| 8,130,836 B2 | 3/2012 | Ha |
| 8,212,921 B2 | 7/2012 | Yun |
| 8,218,812 B2 | 7/2012 | Sugimoto et al. |
| 8,242,974 B2 | 8/2012 | Yamazaki et al. |
| 8,350,799 B2 | 1/2013 | Wasinger et al. |
| 8,400,570 B2 | 3/2013 | Dunn et al. |
| 8,417,376 B1 | 4/2013 | Smolen |
| 8,441,574 B2 | 5/2013 | Dunn et al. |
| 8,544,033 B1 | 9/2013 | Acharya et al. |
| 8,605,121 B2 | 12/2013 | Chu et al. |
| 8,689,343 B2 | 4/2014 | De Laet |
| 8,704,752 B2 | 4/2014 | Wasinger et al. |
| 8,823,630 B2 | 9/2014 | Roberts et al. |
| 8,989,718 B2 * | 3/2015 | Ramer .................. G06Q 30/02 |
| | | 455/414.4 |
| 9,026,686 B2 | 5/2015 | Dunn et al. |
| 9,031,872 B1 | 5/2015 | Foster |
| 10,185,969 B1 | 1/2019 | Holloway et al. |
| 10,225,718 B2 | 3/2019 | Kim et al. |
| 2001/0019454 A1 | 9/2001 | Tadic-Galeb et al. |
| 2002/0013144 A1 * | 1/2002 | Waters .................. G09F 3/00 |
| | | 455/414.1 |
| 2002/0018522 A1 | 2/2002 | Wiedenmann |
| 2002/0026354 A1 | 2/2002 | Shoji et al. |
| 2002/0112026 A1 | 8/2002 | Fridman et al. |
| 2002/0120721 A1 | 8/2002 | Eilers et al. |
| 2002/0147648 A1 | 10/2002 | Fadden et al. |
| 2002/0154138 A1 | 10/2002 | Wada et al. |
| 2002/0163513 A1 | 11/2002 | Tsuji |
| 2002/0164962 A1 | 11/2002 | Mankins et al. |
| 2002/0190972 A1 | 12/2002 | Ven de Van |
| 2002/0194365 A1 | 12/2002 | Jammes |
| 2002/0194609 A1 | 12/2002 | Tran |
| 2003/0031128 A1 | 2/2003 | Kim et al. |
| 2003/0039312 A1 | 2/2003 | Horowitz et al. |
| 2003/0061316 A1 | 3/2003 | Blair et al. |
| 2003/0098881 A1 | 5/2003 | Nolte et al. |
| 2003/0117428 A1 | 6/2003 | Li et al. |
| 2003/0125892 A1 | 7/2003 | Edge |
| 2003/0160734 A1 | 8/2003 | Rogers |
| 2003/0161354 A1 | 8/2003 | Bader et al. |
| 2003/0177269 A1 | 9/2003 | Robinson et al. |
| 2003/0196208 A1 | 10/2003 | Jacobson |
| 2003/0202605 A1 | 10/2003 | Hazra et al. |
| 2003/0227428 A1 | 12/2003 | Nose |
| 2004/0012722 A1 | 1/2004 | Alvarez |
| 2004/0114041 A1 | 6/2004 | Doyle et al. |
| 2004/0136698 A1 | 7/2004 | Mock |
| 2004/0138840 A1 | 7/2004 | Wolfe |
| 2004/0194131 A1 | 9/2004 | Ellis et al. |
| 2004/0207738 A1 | 10/2004 | Wacker |
| 2004/0252187 A1 | 12/2004 | Alden |
| 2005/0005302 A1 | 1/2005 | Zigmond et al. |
| 2005/0012734 A1 | 1/2005 | Johnson et al. |
| 2005/0046951 A1 | 3/2005 | Sugihara et al. |
| 2005/0071252 A1 | 3/2005 | Henning et al. |
| 2005/0123001 A1 | 6/2005 | Craven et al. |
| 2005/0127796 A1 | 6/2005 | Olesen et al. |
| 2005/0134525 A1 | 6/2005 | Tanghe et al. |
| 2005/0134526 A1 | 6/2005 | Willem et al. |
| 2005/0184983 A1 | 8/2005 | Brabander et al. |
| 2005/0188402 A1 | 8/2005 | de Andrade et al. |
| 2005/0195330 A1 | 9/2005 | Zacks et al. |
| 2005/0216939 A1 | 9/2005 | Corbin |
| 2005/0253699 A1 | 11/2005 | Madonia |
| 2005/0289061 A1 | 12/2005 | Kulakowski et al. |
| 2005/0289588 A1 | 12/2005 | Kinnear |
| 2006/0087521 A1 | 4/2006 | Chu et al. |
| 2006/0150222 A1 | 7/2006 | McCafferty et al. |

(56) References Cited

U.S. PATENT DOCUMENTS

| | | |
|---|---|---|
| 2006/0160614 A1 | 7/2006 | Walker et al. |
| 2006/0214904 A1 | 9/2006 | Kimura et al. |
| 2006/0215044 A1 | 9/2006 | Masuda et al. |
| 2006/0244702 A1 | 11/2006 | Yamazaki et al. |
| 2007/0047808 A1 | 3/2007 | Choe et al. |
| 2007/0094620 A1 | 4/2007 | Park |
| 2007/0127569 A1 | 6/2007 | Hatalker |
| 2007/0152949 A1 | 7/2007 | Sakai |
| 2007/0157260 A1 | 7/2007 | Walker |
| 2007/0164932 A1 | 7/2007 | Moon |
| 2007/0165955 A1 | 7/2007 | Hwang et al. |
| 2007/0168539 A1 | 7/2007 | Day |
| 2007/0200513 A1 | 8/2007 | Ha et al. |
| 2007/0211179 A1 | 9/2007 | Hector et al. |
| 2007/0241203 A1* | 10/2007 | Wagner ............ G05D 23/1905 236/1 C |
| 2007/0247594 A1 | 10/2007 | Tanaka |
| 2007/0274400 A1 | 11/2007 | Murai et al. |
| 2007/0286107 A1 | 12/2007 | Singh et al. |
| 2008/0008471 A1 | 1/2008 | Dress |
| 2008/0017422 A1 | 1/2008 | Carro |
| 2008/0018584 A1 | 1/2008 | Park et al. |
| 2008/0028059 A1 | 1/2008 | Shin et al. |
| 2008/0037783 A1 | 2/2008 | Kim et al. |
| 2008/0055247 A1 | 3/2008 | Boillot |
| 2008/0074372 A1 | 3/2008 | Baba et al. |
| 2008/0093443 A1 | 4/2008 | Barcelou |
| 2008/0104631 A1 | 5/2008 | Krock et al. |
| 2008/0106527 A1 | 5/2008 | Cornish et al. |
| 2008/0112601 A1 | 5/2008 | Warp |
| 2008/0119237 A1 | 5/2008 | Kim |
| 2008/0143637 A1 | 6/2008 | Sunahara et al. |
| 2008/0163291 A1 | 7/2008 | Fishman et al. |
| 2008/0170028 A1 | 7/2008 | Yoshida |
| 2008/0174522 A1 | 7/2008 | Cho et al. |
| 2008/0201208 A1 | 8/2008 | Tie et al. |
| 2008/0231604 A1 | 9/2008 | Peterson |
| 2008/0232478 A1 | 9/2008 | Teng et al. |
| 2008/0246871 A1 | 10/2008 | Kupper et al. |
| 2008/0259198 A1* | 10/2008 | Chen ................ G09G 3/3406 348/333.01 |
| 2008/0266331 A1 | 10/2008 | Chen et al. |
| 2008/0272999 A1 | 11/2008 | Kurokawa et al. |
| 2008/0278432 A1 | 11/2008 | Ohshima |
| 2008/0278455 A1 | 11/2008 | Atkins et al. |
| 2008/0303918 A1 | 12/2008 | Keithley |
| 2008/0313046 A1 | 12/2008 | Denenburg et al. |
| 2009/0036190 A1 | 2/2009 | Brosnan et al. |
| 2009/0058845 A1 | 3/2009 | Fukuda et al. |
| 2009/0102914 A1 | 4/2009 | Collar et al. |
| 2009/0102973 A1 | 4/2009 | Harris |
| 2009/0109165 A1 | 4/2009 | Park et al. |
| 2009/0128867 A1 | 5/2009 | Edge |
| 2009/0164615 A1 | 6/2009 | Akkanen |
| 2009/0182917 A1 | 7/2009 | Kim |
| 2009/0219295 A1 | 9/2009 | Reijnaerts |
| 2009/0251602 A1 | 10/2009 | Williams et al. |
| 2009/0254439 A1 | 10/2009 | Dunn |
| 2009/0260028 A1 | 10/2009 | Dunn et al. |
| 2009/0267866 A1 | 10/2009 | Reddy et al. |
| 2009/0273568 A1 | 11/2009 | Milner |
| 2009/0289968 A1 | 11/2009 | Yoshida |
| 2009/0313125 A1 | 12/2009 | Roh et al. |
| 2009/0315867 A1 | 12/2009 | Sakamoto et al. |
| 2010/0039440 A1 | 2/2010 | Tanaka et al. |
| 2010/0039696 A1 | 2/2010 | de Groot et al. |
| 2010/0042506 A1 | 2/2010 | Ravenel et al. |
| 2010/0060550 A1 | 3/2010 | McGinn et al. |
| 2010/0083305 A1 | 4/2010 | Acharya et al. |
| 2010/0104003 A1 | 4/2010 | Dunn et al. |
| 2010/0109974 A1 | 5/2010 | Dunn et al. |
| 2010/0121693 A1 | 5/2010 | Pacana |
| 2010/0171889 A1 | 7/2010 | Pantel et al. |
| 2010/0177157 A1 | 7/2010 | Berlage |
| 2010/0177158 A1 | 7/2010 | Walter |
| 2010/0188342 A1 | 7/2010 | Dunn |
| 2010/0194861 A1 | 8/2010 | Hoppenstein |
| 2010/0195865 A1 | 8/2010 | Luff |
| 2010/0198983 A1 | 8/2010 | Monroe et al. |
| 2010/0231563 A1 | 9/2010 | Dunn et al. |
| 2010/0238299 A1 | 9/2010 | Dunn et al. |
| 2010/0242081 A1 | 9/2010 | Dunn et al. |
| 2010/0253613 A1 | 10/2010 | Dunn et al. |
| 2010/0253778 A1 | 10/2010 | Lee et al. |
| 2011/0012856 A1 | 1/2011 | Maxwell et al. |
| 2011/0047567 A1 | 2/2011 | Zigmond et al. |
| 2011/0069018 A1 | 3/2011 | Atkins et al. |
| 2011/0074803 A1 | 3/2011 | Kerofsky |
| 2011/0078536 A1 | 3/2011 | Han et al. |
| 2011/0102630 A1 | 5/2011 | Rukes |
| 2011/0181693 A1 | 7/2011 | Lee et al. |
| 2011/0225859 A1 | 9/2011 | Safavi |
| 2011/0258011 A1* | 10/2011 | Burns ................ G06Q 10/06 705/7.15 |
| 2011/0273482 A1 | 11/2011 | Massart et al. |
| 2012/0075423 A1 | 3/2012 | Ichioka et al. |
| 2012/0182278 A1 | 7/2012 | Ballestad |
| 2012/0188262 A1 | 7/2012 | Rabii |
| 2012/0203872 A1 | 8/2012 | Luby et al. |
| 2012/0302343 A1 | 11/2012 | Hurst et al. |
| 2013/0110565 A1 | 5/2013 | Means, Jr. et al. |
| 2013/0162908 A1 | 6/2013 | Son et al. |
| 2013/0232029 A1* | 9/2013 | Rovik ................ G07C 5/008 705/26.8 |
| 2014/0043302 A1 | 2/2014 | Barnes |
| 2014/0114778 A1* | 4/2014 | Miller ................ G06Q 20/20 705/16 |
| 2014/0136935 A1* | 5/2014 | Santillie ............ G06F 17/248 715/204 |
| 2014/0139116 A1 | 5/2014 | Reed |
| 2014/0222578 A1 | 8/2014 | Poornachandran et al. |
| 2014/0236728 A1* | 8/2014 | Wright .............. G06Q 30/0267 705/14.58 |
| 2014/0333541 A1 | 11/2014 | Lee et al. |
| 2014/0375704 A1 | 12/2014 | Bi et al. |
| 2015/0070340 A1 | 3/2015 | Trachtenberg et al. |
| 2015/0128076 A1 | 5/2015 | Fang et al. |
| 2015/0172848 A1* | 6/2015 | Gao .................. H04W 52/0229 455/41.3 |
| 2015/0172878 A1* | 6/2015 | Luna ................ H04W 4/12 455/412.2 |
| 2015/0227978 A1* | 8/2015 | Woycik ............ G06Q 30/0268 705/14.65 |
| 2015/0312488 A1 | 10/2015 | Kostrzewa et al. |
| 2016/0012487 A1 | 1/2016 | Bastaldo-Tsampalis et al. |
| 2016/0014103 A1 | 1/2016 | Masters et al. |
| 2016/0034240 A1 | 2/2016 | Kreiner et al. |
| 2016/0063954 A1 | 3/2016 | Ryu |
| 2016/0125777 A1 | 5/2016 | Knepper et al. |
| 2016/0293206 A1* | 10/2016 | Dunn ................ G11B 20/10527 |
| 2016/0358357 A1 | 12/2016 | Dunn et al. |
| 2017/0111486 A1 | 4/2017 | Bowers et al. |
| 2017/0201797 A1 | 7/2017 | Kwon |
| 2019/0113959 A1* | 4/2019 | Lee .................. G06F 1/3203 |

FOREIGN PATENT DOCUMENTS

| | | |
|---|---|---|
| CN | 102246196 A | 11/2011 |
| EP | 0313331 A2 | 4/1989 |
| EP | 1640337 A2 | 3/2006 |
| EP | 2332120 A2 | 6/2011 |
| EP | 2401736 A2 | 1/2012 |
| EP | 2401869 A2 | 1/2012 |
| ID | 0514488 A | 9/2011 |
| JP | 2002064842 A | 2/2002 |
| JP | 2002209230 A | 7/2002 |
| JP | 2002366121 A | 12/2002 |
| JP | 2005236469 A | 9/2005 |
| JP | 2006184859 A | 7/2006 |
| JP | 2008034841 A | 2/2008 |
| JP | 2008165055 A | 7/2008 |
| JP | 2009009422 A | 1/2009 |
| KR | 20000021499 A | 4/2000 |

(56) References Cited

FOREIGN PATENT DOCUMENTS

| | | |
|---|---|---|
| KR | 20020072633 A | 9/2002 |
| TW | 200403940 A | 3/2004 |
| WO | WO9608892 A1 | 3/1996 |
| WO | WO2006089556 A1 | 8/2006 |
| WO | WO2006111689 A1 | 10/2006 |
| WO | WO2009004574 A1 | 1/2009 |
| WO | WO2010037104 A2 | 4/2010 |
| WO | WO2010085783 A1 | 7/2010 |
| WO | WO2010085784 A2 | 7/2010 |
| WO | WO2010094039 A2 | 8/2010 |
| WO | WO2010099178 A2 | 9/2010 |
| WO | WO2010099194 A2 | 9/2010 |
| WO | WO2011026186 A1 | 3/2011 |
| WO | WO2011035370 A1 | 3/2011 |
| WO | WO2011044640 A1 | 4/2011 |
| WO | WO2011060487 A1 | 5/2011 |
| WO | WO2011143720 A1 | 11/2011 |
| WO | WO2016000546 A1 | 1/2016 |

OTHER PUBLICATIONS

Analog Devices, Inc., JPEG 2000 Video Codec ADV212, 2006, 44 pages.
Photo Research, Inc., PR-650 SpectraScan Colorimeter, 1999, 2 pages.
Teravision Corp, LCD-TV Panel Control Board Specification, Nov. 2007, 24 pages.
Texas Advanced Optoelectronic Solutions Inc., TCS230 Programmable Color Light-To-Frequency Converter, Dec. 2007, 12 pages.
Texas Advanced Optoelectronic Solutions Inc., TCS3404CS, TCS3414CS Digital Color Light Sensors, Feb. 2009, 38 pages.
Wikipedia, Color rendering index, https://en.wikipedia.org/wiki/Color_rendering_index, accessed Aug. 25, 2016, 13 pages.
Wikipedia, Gamut, https://en.wikipedia.org/wiki/Gamut, accessed Aug. 25, 2016, 8 pages.
Wikipedia, Gradient-index optics, https://en.wikipedia.org/wiki/Gradient-index_optics, accessed Aug. 25, 2016, 5 pages.

* cited by examiner

SMART ELECTRONIC DISPLAY FOR RESTAURANTS

CROSS-REFERENCE TO RELATED APPLICATIONS

This application claims the benefit of U.S. Provisional Application No. 62/162,420, filed May 15, 2015 which is herein incorporated by reference in its entirety.

TECHNICAL FIELD

Embodiments generally relate to electronic displays used for point of sale and quick service drive through applications.

BACKGROUND OF THE ART

Electronic displays are now being used for menu boards in restaurants, both dine in, as well as drive through quick service restaurants.

SUMMARY OF THE EXEMPLARY EMBODIMENTS

Exemplary embodiments provide a system and method for providing communication between a smart device and an electronic display menu board. A Bluetooth low energy transmitter/receiver is preferably used to determine if a compatible smart device is within close proximity to the display. If so, the system can perform a number of operations including checking to see if this smart device has been in close proximity before, and if so what was purchased. The system can also transmit the menu data to the smart device so that the user can review the menu and place an order through the smart device.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
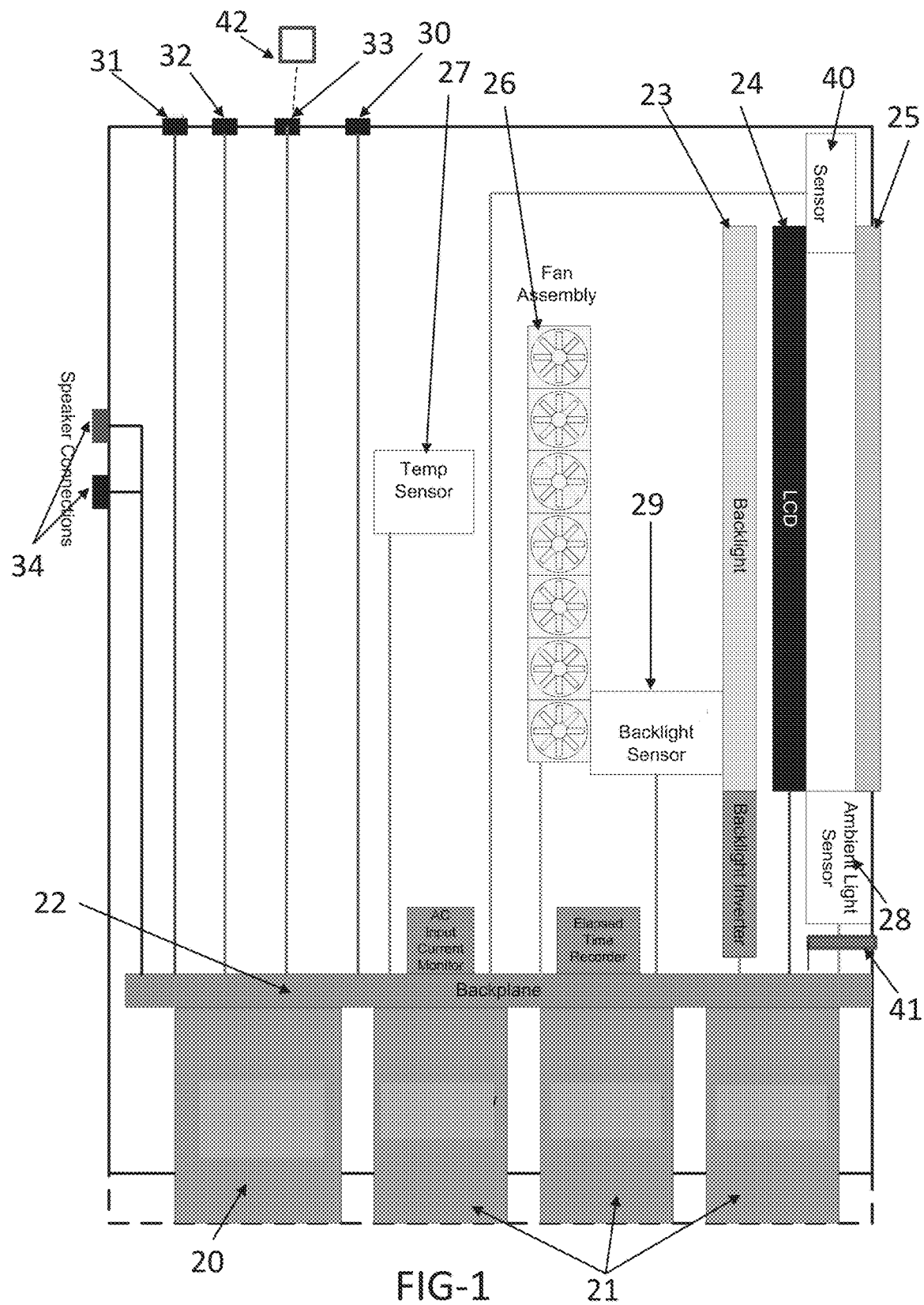
FIG. 1 is a simplified bock diagram of one type of electronic menu board.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 provides a block diagram for various electronic components which may be used within an exemplary electronic display assembly. One or more power modules 21 may be placed in electrical connection with a backplane 22, which could be provided as a printed circuit board which may facilitate electrical communication and/or power between a number of components in the display assembly. A display controlling assembly 20 may also be in electrical connection with the backplane 22. The display controlling assembly 20 preferably includes a number of different components, including but not limited to a video player, electronic storage device, and a microprocessor which is programmed to perform any of the logic that is described within this application as well as other logic common to this technology but not explicitly described herein. It should also be noted that any storage of data for any of the embodiments described herein can occur at either: (1) the electronic storage device on the display controlling assembly 20, (2) a remote server 42 which can be accessed through second data interface connection 33, or (3) stored both on the local storage device on the display controlling assembly 20 as well as a periodic backup stored on the remote server 42.

This figure also shows a backlight 23, LCD assembly 24, and a front transparent display panel 25. The backlight 23 may be a CCFL or light emitting diode (LED) backlight. It should be noted that although the setup for an LCD is shown, embodiments can be practiced with any electronic image-producing assembly. Thus any other flat panel display could be used, including but not limited to plasma, light-emitting polymers, and organic light emitting diode (OLED) displays. A fan assembly 26 is shown for optionally cooling displays which may reach elevated temperatures. One or more temperature sensors 27 may be used to monitor the temperature of the display assembly, and selectively engage fan assembly 26 when cooling is needed. An ambient light sensor 28 is preferably positioned to measure the amount of ambient light that is contacting the front display panel 25.

A variety of different electrical inputs/outputs are also shown, and all or only a select few of the inputs/outputs may be practiced with any given embodiment. The AC power input 30 delivers the incoming power to the backplane 22. A video signal input 31 can receive video signals from a plurality of different sources. In a preferred embodiment the video signal input 31 would be an HDMI input. Two data interface connections 32 and 33 are also shown. The first data interface connection 32 is preferably a Bluetooth low energy transmitter/receiver. In an exemplary embodiment, the data interface connection 32 is provided as an iBeacon transmitter/receiver. The second data interface connection 33 may be a network connection such as an Ethernet port, wireless network connection, or a satellite network connection. The second data interface connection 33 preferably allows the display assembly to communicate with the internet, and may also permit a remote user to communicate with the display assembly. The second data interface connection 33 can also provide the video data through a network source. The second data interface connection 33 can also be utilized to transmit display settings, error messages, and various other forms of data to a website for access and control by the user. Optional audio connections 34 may also be provided for connection to internal or external speaker assemblies.

A backlight sensor 29 is preferably placed within the backlight cavity to measure the amount of luminance being generated within the backlight cavity. Additionally, a display luminance sensor 40 is preferably positioned in front of the display 24 in order to measure the amount of luminance exiting the display 24. A camera 41 may be positioned to record the area surrounding the display and is also preferably placed in electrical connection with the backplane 22.

The Bluetooth low energy transmitter/receiver 32 allows communication with smart phone devices which may be within relatively close proximity of the electronic display. Generally speaking, the Bluetooth low energy transmitter/receiver 32 sends out a signal to notify smart phone devices in the area of the presence of the transmitter/receiver 32 and can both push data to these devices as well as pull data from these devices. A number of functions using this communication is described further below.

Figure 2:
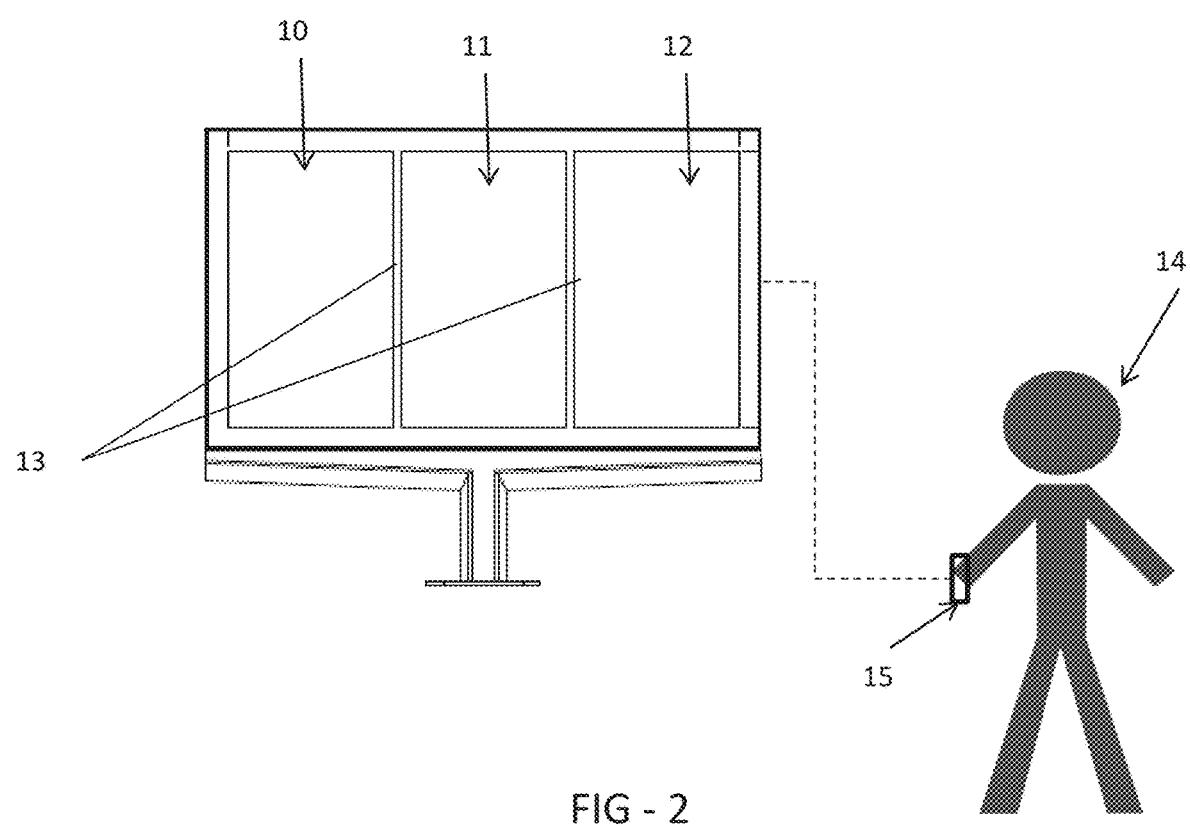
FIG. 2 is a schematic illustration of a user approaching one type of electronic menu board on foot.

FIG. 2 is a schematic illustration of a user 14 approaching one type of electronic menu board on foot. In this embodiment, three separate displays 10, 11, and 12 are placed in a 1×3 array and contained within a housing that places a portion of the bezel 13 in between each display. Each display 10, 11, and 12 may contain each of the components shown above in FIG. 1 or only a portion of the shown components. Once the user 14 enters a certain proximity to the displays 10, 11, and 12, the transmitter/receiver 32 of one or more of the displays may begin communicating with the smart phone device 15 of the user 14.

Figure 3:
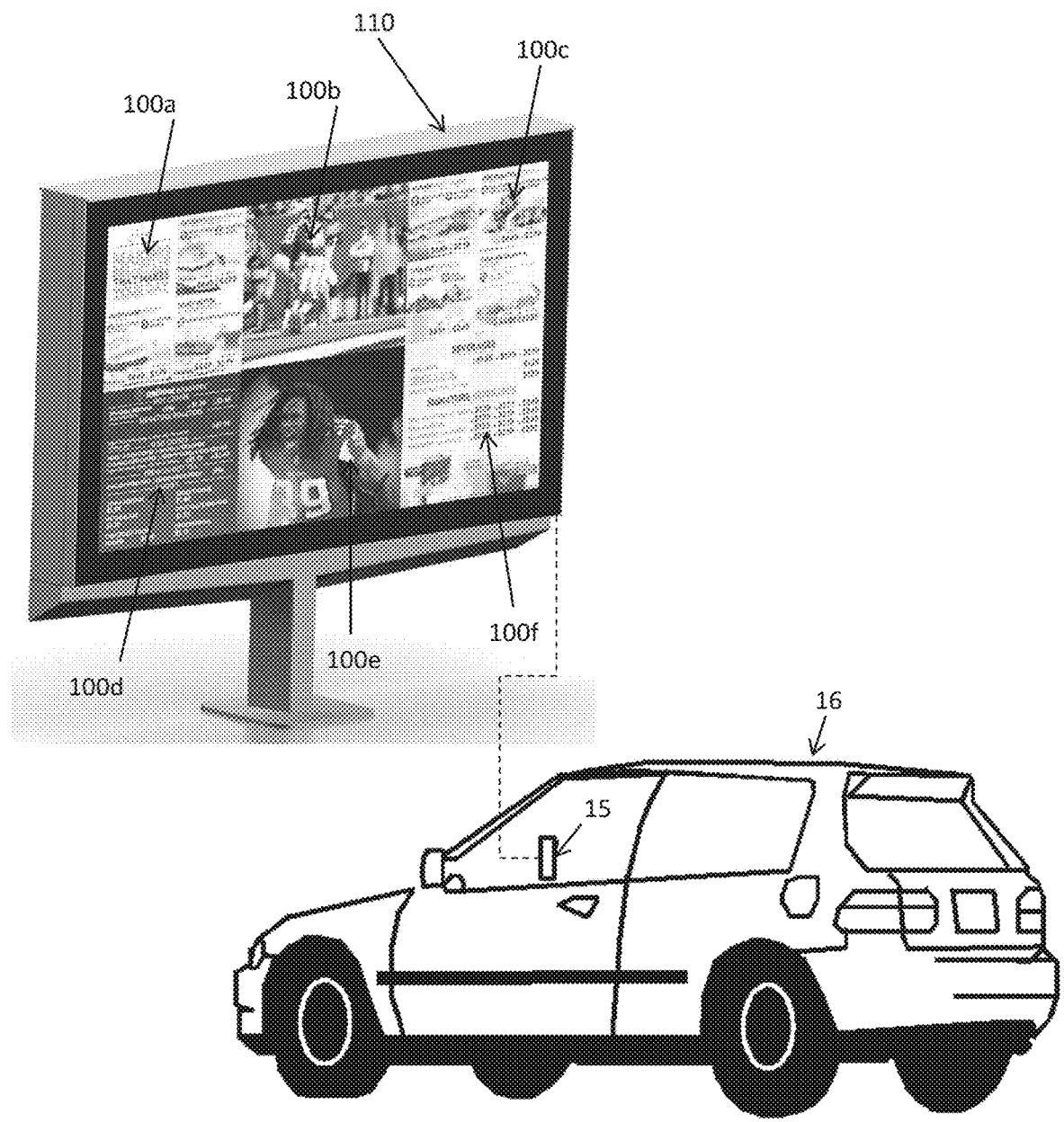
FIG. 3 is a schematic illustration of a user approaching a second type of electronic menu board while operating an automobile.

FIG. 3 is a schematic illustration of a user approaching a second type of electronic menu board while operating an automobile 16. Here, a single monolithic display 110 is contained within a housing. The assembly lacks the bezels which would need to be placed between each display. The display 110 can be driven in separately controllable areas 100a-100f, where in this case each area is being driven to show a different image. This assembly only requires a single collection of the components shown in FIG. 1. Once the automobile 16 enters a certain proximity to the display 110, the transmitter/receiver 32 of the display may begin communicating with the smart phone device 15 within the automobile 16. It should be noted that a user can approach a monolithic display such as this on foot (similar to what is shown in FIG. 2). Further, it should also be noted that the array of displays shown in FIG. 2 can be approached by a user operating an automobile 16, as shown in FIG. 3.

Figure 4:
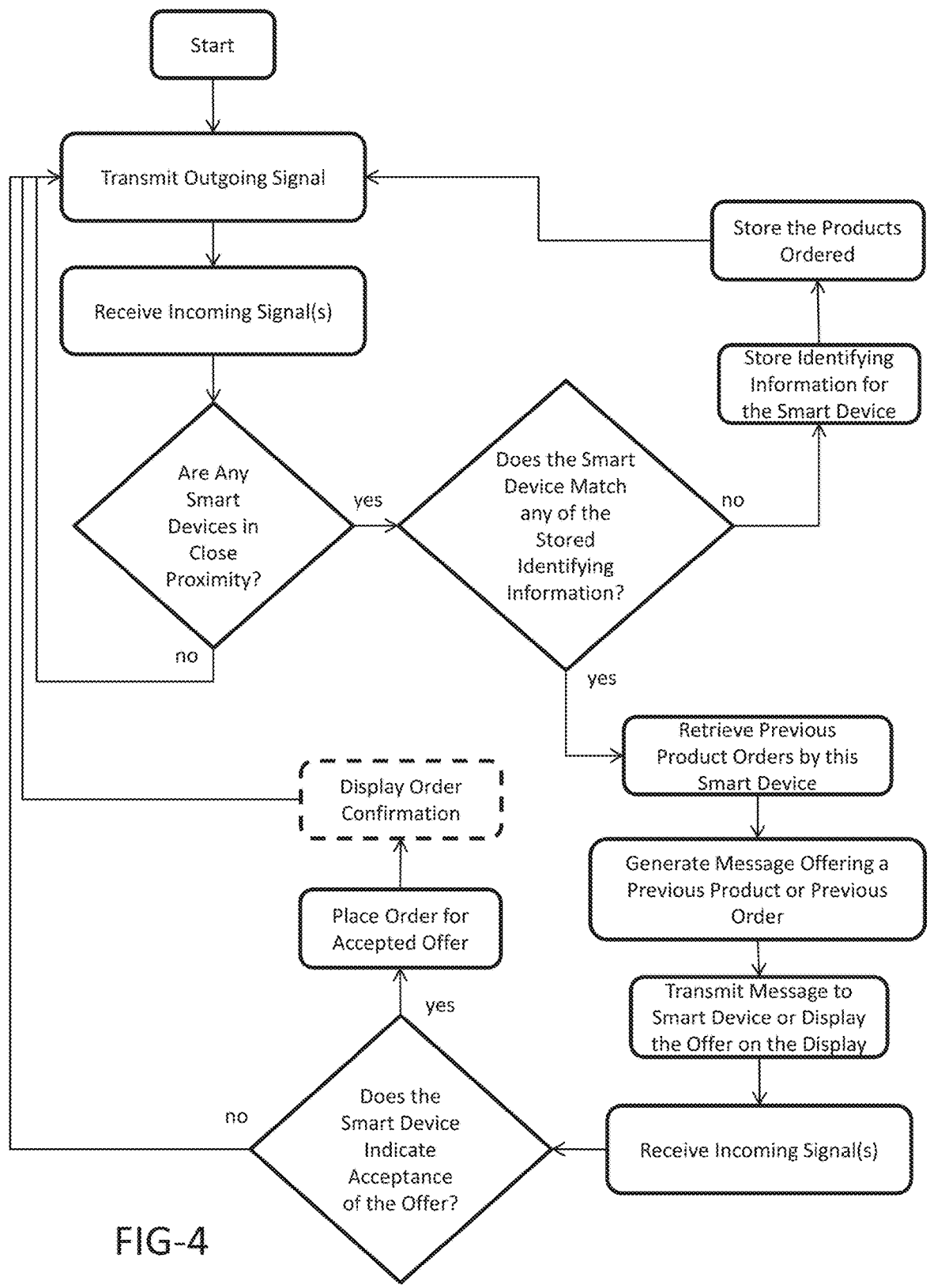
FIG. 4 is a logic flowchart showing one embodiment for operating the displays described herein.

FIG. 4 is a logic flowchart showing one embodiment for operating the displays described herein. Initially, the transmitter/receiver 32 transmits outgoing signals as well as receives incoming signals. The system then determines if a smart device is within close proximity to the display. If not, the system returns to transmit outgoing signals and receive incoming signals.

If a smart device is in close proximity to the display, the system preferably begins to search through stored identifying information (which can be stored electronically on the electronic storage device on the display controlling assembly 20 or remotely on a server that can be accessed through second data interface connection 33) to determine if the smart device matches any of the stored identifying information. If not, the system preferably stores identifying information for the smart device along with the products ordered, which are stored in association with the identifying information for the smart device.

If the smart device matches any of the stored identifying information, the system should preferably access the electronic storage device to retrieve previous product orders by this smart device. Ideally, the system would then generate a message for the smart device making an offer to sell a previous product or previous purchase to the user. This message is transmitted to the smart device. Alternatively, the system could also display the previous order on the display, prompting the user on whether they would like to place the same order. The system would then receive incoming signals and determine if the smart device indicates an acceptance of the offer by the user (if using the embodiment where the offer is sent to the smart device). If yes, the system would place the order for the accepted offer and optionally display the order confirmation to the user on the display. If not, the system simply returns to again transmit outgoing signals and receive incoming signals until another smart device is detected.

Figure 5:
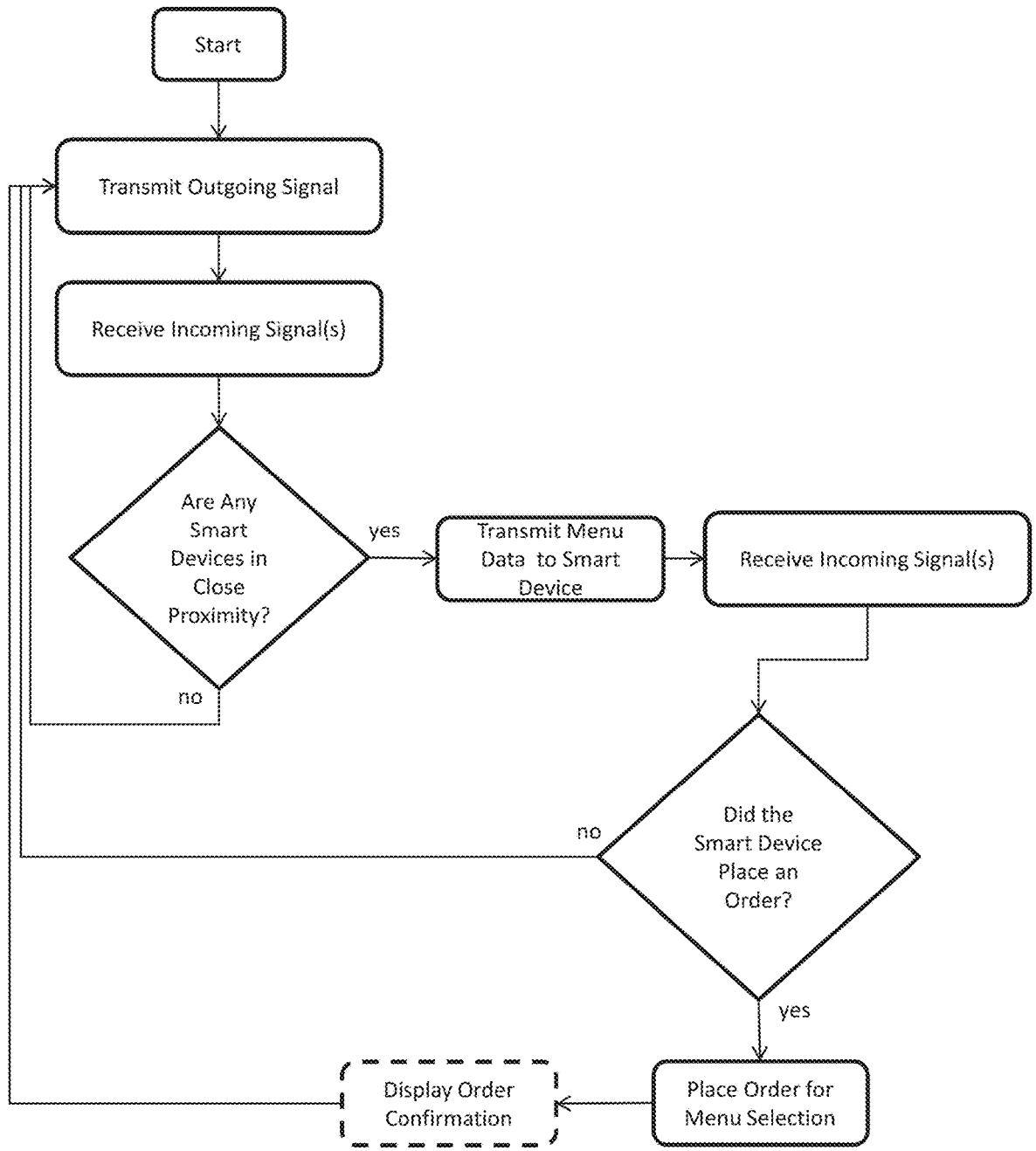
FIG. 5 is a logic flowchart showing a second embodiment for operating the displays described herein.

FIG. 5 is a logic flowchart showing a second embodiment for operating the displays described herein. Similar to the initial start of the method shown in FIG. 4, the transmitter/receiver 32 transmits outgoing signals as well as receives incoming signals. The system then determines if a smart device is within close proximity to the display. If not, the system returns to transmit outgoing signals and receive incoming signals.

In this embodiment, if a smart device is detected in close proximity to the display, the system will transmit menu data to the smart device. In this embodiment, the menu data can be stored electronically on the electronic storage device on the display controlling assembly 20. The transmitter/receiver 32 would then receive any incoming signals and determine if the smart device has placed an order for a menu selection. If not, the system returns to transmit outgoing signals and receive incoming signals. If so, the system places the order for the menu selection and optionally displays a confirmation of the order to the user through the display.

Figure 6:
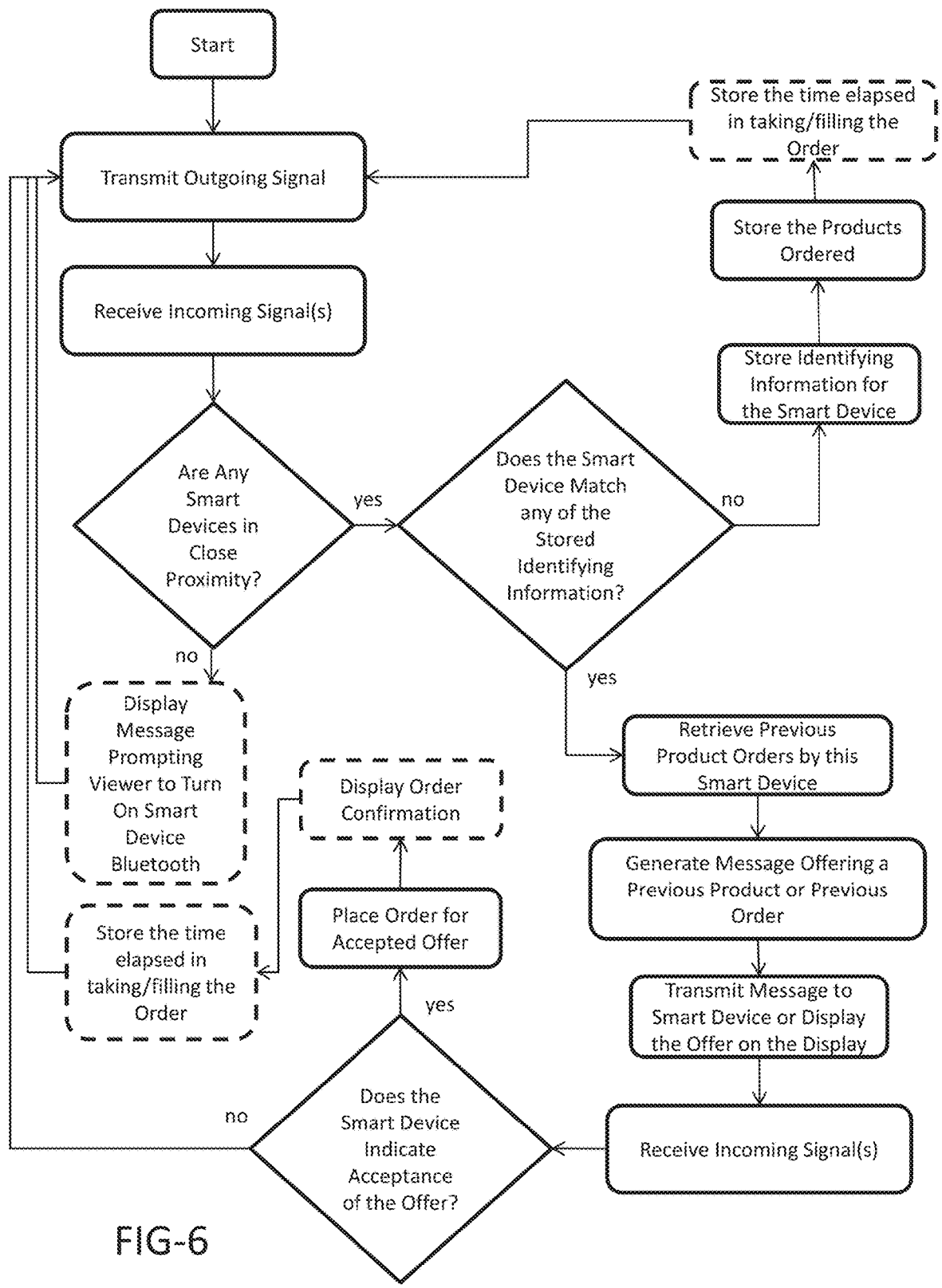
FIG. 6 is a logic flowchart showing a third embodiment for operating the displays described herein.

FIG. 6 is a logic flowchart showing a third embodiment for operating the displays described herein. This embodiment is similar to the logic shown above in FIG. 4, but with a couple notable differences. First, in this embodiment, if the system does not detect a smart device in close proximity, a message is displayed which prompts the viewer to turn on their smart device Bluetooth functionality. The second difference between this embodiment and that of FIG. 4 is that the time elapsed during the taking and/or filling of the order can be stored. This permits a later statistical analysis of the times for taking an order and filling an order, to improve or analyze the performance of the system.

Figure 7:
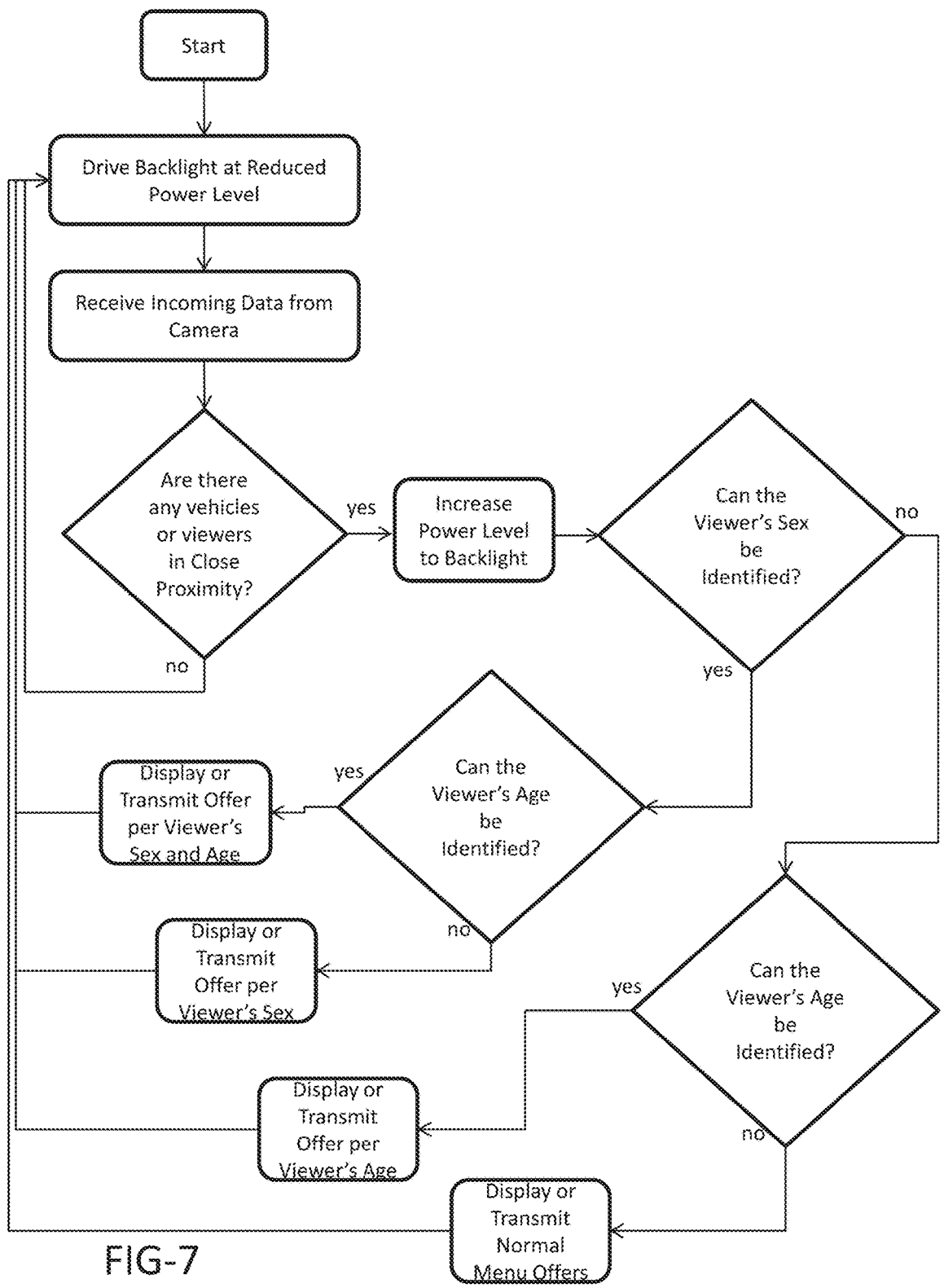
FIG. 7 is a logic flowchart showing a fourth embodiment for operating the displays described herein.

FIG. 7 is a logic flowchart showing a fourth embodiment for operating the displays described herein. This embodiment would preferably utilize the camera 41 described above. In this embodiment, the display would normally be driven with the backlight at a reduced power level in order to save power (as well as wear and tear on some of the electronics and fans). As the system receives data from the camera 41, the backlight power can be increased once a vehicle or viewer is determined to be in close proximity to the display. Once the system determines that a vehicle or viewer is in close proximity to the display, the system may check to see if the viewer's sex can be identified. Optionally, the system can also check to see if the viewer's age can be identified as well. If the viewer's age and sex can be identified, then an offer is displayed or transmitted to the viewer which is tailored to the viewer's age and sex. If the viewer's age can be determined but not sex, then an offer is displayed or transmitted to the viewer which is tailored to the viewer's age. If the viewer's sex can be determined but not age, then an offer is displayed or transmitted to the viewer which is tailored to the viewer's sex. If neither the viewer's sex nor age can be determined, then the system may display or transmit the normal menu offerings. As used in this embodiment, the term 'transmit' is used to mean the electronic transmission of an offer to the user's smart device.

Camera recognition software having the functionality described herein is commercially available from KeyLemon in Switzerland (www.keylemon.com) as well as FaceFirst in Westlake Village, Calif. (www.facefirst.com).

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A system for efficiently displaying an individualized offer for a particular menu item to a user of an identified smart device, said system comprising:
   - an electronic menu board configured to display the individualized offer for the particular menu item to the user along with other menu items, wherein the electronic menu board comprises a monolithic display comprising separately controllable areas configured to be individually driven;
   - a wireless transmitter/receiver in electronic communication with the electronic menu board, wherein the wireless transmitter/receiver is configured to transmit an outgoing signal within a transmission area and receive an incoming signal identifying the identified smart device within the transmission area;
   - an electronic storage device configured to store a unique identifier for the identified smart device and order history data associated with the unique identifier, wherein the electronic storage device is in electronic communication with the wireless transmitter/receiver;
   - a display controlling assembly electrically connected to the electronic menu board, the wireless transmitter/receiver, and the electronic storage device, wherein said display controlling assembly is configured to generate the individualized offer based on the order history data associated with the unique identifier for the identified smart device, wherein said display controlling assembly is further configured to transmit the individualized offer to the electronic menu board for display at a first one of the separately controllable areas and the identified smart device for display, wherein the particular menu item is associated with one or more menu items in the order history data associated with the unique identifier for the identified smart device, and wherein said display controlling assembly is further configured to display the other menu items in at least one other of said separately controllable areas;
   - a second wireless transmitter/receiver electrically connected to the display controlling assembly; and
   - a camera positioned to record a second area, said camera configured to transmit a recorded image to the display controlling assembly, wherein the display controlling assembly is further configured to drive a backlight of the electronic menu board at a baseline power level and increase the power level supplied to the backlight following receipt of the recorded image from the camera indicating the user or a vehicle associated with the user within the second area;
   - wherein the display controlling assembly is further configured to transmit an order for the particular menu item to the second wireless transmitter/receiver upon receipt of one or more signals from the identified smart device indicating acceptance of the individualized offer.

2. The system of claim 1 wherein:
said electronic storage device is located remote from the electronic menu board.

3. The system of claim 1 wherein:
the display controlling assembly comprises facial recognition software and is configured to process the recorded image and generate viewer data for the user wherein said viewer data is also used to generate the individualized image offer.

4. The system of claim 3 wherein:
the viewer data comprises the user's age.

5. The system of claim 3 wherein:
the viewer data comprises the user's sex.

6. The system of claim 1 wherein:
the display controlling assembly comprises a video player, an electronic storage device, and a microprocessor.

7. The system of claim 1 further comprising:
a power module; and
a backplane in electrical communication with the power module, electronic menu board, wireless transmitter/receiver, electronic storage device, and display controlling assembly.

8. A system for displaying individualized offers for particular menu items to users of smart devices, said system comprising:
   - a housing;
   - a monolithic electronic menu board located within the housing and comprising separately controllable areas;

a wireless transmitter/receiver located on or within the housing and configured to periodically transmit outgoing signals and periodically receive corresponding incoming signals identifying smart devices within a transmission area and order selections by users of the smart devices;

an electronic storage device electrically connected to the wireless transmitter/receiver and configured to store a unique identifier for each of the smart devices identified by the wireless transmitter/receiver along with order history data associated with each of the unique identifiers; and a display controlling assembly electrically connected to the electronic storage device and the monolithic electronic menu board, wherein said display controlling assembly is configured to receive the associated order history data, generate the individualized offers based on the associated order history data, transmit the individualized offers to the monolithic electronic menu board for display at a first one of the separately controllable areas and the identified smart devices for display, wherein each of the particular menu items comprise menu items listed in the order history data associated with the respective unique identifier, and receive signals from one or more of the smart devices indicating acceptance of the respective individualized offers, wherein said display controlling assembly is further configured to display other menu items at other ones of said separately controllable areas of said monolithic electronic menu board;

a second wireless transmitter/receiver electrically connected to the display controlling assembly and configured to receive signals from the display controlling assembly indicating acceptance of the individualized offers; and a camera positioned to record an area in proximity to the electronic menu board, wherein said camera is configured to transmit recorded images to the display controlling assembly, and wherein the display controlling assembly is further configured to drive a backlight of the electronic menu board at a baseline power level and increase the power level supplied to the backlight following receipt of the recorded images at the camera indicating one or more users or vehicles within the area.

9. The system of claim 8 further comprising:

an elapsed time recorder in communication with the display controlling assembly and the electronic storage device, wherein said elapsed time recorder is configured to measure the elapsed time between receiving the order selection and filling the order and transmit the elapsed time to the electronic storage device.

10. The system of claim 8 wherein:

the display controlling assembly comprises facial recognition software configured to process the recorded image and generate viewer data wherein said viewer data is also used to generate the individualized offer.

11. A method for displaying an individualized offer to a user of an identified smart device, said method comprising the steps of:

driving a backlight of an electronic menu board at a first power level;

transmitting an outgoing wireless signal from a wireless transmitter/receiver located at the electronic menu board within a transmission area;

receiving an incoming wireless signal at the wireless transmitter/receiver from the identified smart device within the transmission area of the outgoing wireless signal;

receiving images from a camera indicating the user or a vehicle associated with the user within a detection area;

driving the backlight of the electronic menu board at a second power level that is greater than the first power level following the receipt of the images from the camera indicating detection of at least one user or the vehicle within the detection area;

analyzing the incoming wireless signal from the wireless transmitter/receiver to identify a unique identifier for the identified smart devices within the transmission area;

querying an electronic storage device to retrieve order history data associated with the unique identifier;

generating the individualized offer, wherein said individualized offer comprises at least one menu item listed in the retrieved order history data;

displaying the individualized offer at a first one of a plurality of separately controllable areas of the electronic menu board and the identified smart device, wherein the electronic menu board comprises a monolithic display;

displaying menu items at other ones of said plurality of separately controllable areas;

receiving an acceptance of the individualized offer from the smart device by way of the wireless transmitter/receiver; and transmitting the acceptance to a second wireless transmitter/receiver to fulfil the accepted individualized offer.

12. The method of claim 11 further comprising the steps of:

recording, by way of an elapsed time recorder, the elapsed time between receiving the order selection and filling the order; and electronically transmitting the elapsed time from the elapsed time recorder to the electronic storage device for recordation.

* * * * *